(12) United States Patent
Wu

(10) Patent No.: US 10,227,014 B2
(45) Date of Patent: Mar. 12, 2019

(54) CHARGE GUN, ELECTRIC VEHICLE SUPPLY EQUIPMENT, AND ELECTRIC VEHICLE CHARGING METHOD THEREOF

(71) Applicant: DELTA ELECTRONICS, INC., Taoyuan (TW)

(72) Inventor: Tsung-Yuan Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 69 days.

(21) Appl. No.: 15/336,804

(22) Filed: Oct. 28, 2016

(65) Prior Publication Data

US 2017/0334301 A1 Nov. 23, 2017

(30) Foreign Application Priority Data

May 18, 2016 (TW) .............................. 105115259 A

(51) Int. Cl.
*H02J 7/00* (2006.01)
*B60L 11/18* (2006.01)

(52) U.S. Cl.
CPC ....... *B60L 11/1818* (2013.01); *B60L 11/1824* (2013.01); *H02J 7/0026* (2013.01); *H02J 7/0045* (2013.01)

(58) Field of Classification Search
CPC . B60L 11/1818; B60L 11/1824; H02J 7/0045; H02J 7/0026
USPC ......................................................... 320/109
See application file for complete search history.

(56) References Cited

U.S. PATENT DOCUMENTS

| | | | | |
|---|---|---|---|---|
| 7,688,024 | B2* | 3/2010 | Kamaga ................ | B60L 3/0069 180/65.21 |
| 8,618,767 | B2* | 12/2013 | Ishii ...................... | B60L 3/0069 320/104 |
| 8,729,856 | B2* | 5/2014 | Nathan .............. | H01R 13/6683 320/109 |
| 9,573,478 | B2* | 2/2017 | Jefferies .............. | B60L 11/1818 |
| 9,718,374 | B2* | 8/2017 | Tang .................. | B60L 11/1816 |
| 9,845,021 | B2* | 12/2017 | Yang ................... | B60L 11/1838 |
| 2009/0167537 | A1 | 7/2009 | Feliss et al. | |

(Continued)

FOREIGN PATENT DOCUMENTS

| | | |
|---|---|---|
| CN | 103532178 A | 1/2014 |
| CN | 204497757 U | 7/2015 |

(Continued)

*Primary Examiner* — M Baye Diao
(74) *Attorney, Agent, or Firm* — CKC & Partners Co., LLC

(57) ABSTRACT

A charge gun and an Electric Vehicle Supply Equipment (EVSE) are provided. The charge gun includes at least one charging terminal, a ground terminal, a control pilot terminal and an over temperature detecting circuit. The charging terminal is configured to be electrically coupled to an electric vehicle to charge the electric vehicle. The ground terminal is electrically coupled to an equipment ground. The control pilot terminal is configured to transmit a control pilot signal between the charge gun and the electric vehicle. The over-temperature detecting circuit is electrically coupled between the ground terminal and the control pilot terminal. The over-temperature detecting circuit includes a temperature sensor and a resistance of temperature sensor changes correspondingly when a temperature of the charge gun exceeds a safety limit value.

18 Claims, 8 Drawing Sheets

(56) References Cited

U.S. PATENT DOCUMENTS

| | | | |
|---|---|---|---|
| 2013/0134933 A1* | 5/2013 | Drew | H02H 5/04 |
| | | | 320/109 |
| 2014/0035527 A1 | 2/2014 | Hayashigawa et al. | |
| 2014/0049218 A1 | 2/2014 | Morand et al. | |
| 2016/0137079 A1 | 5/2016 | Jefferies et al. | |
| 2016/0152151 A1* | 6/2016 | Yang | B60L 11/1812 |
| | | | 320/109 |

FOREIGN PATENT DOCUMENTS

| | | |
|---|---|---|
| EP | 3025902 A1 | 6/2016 |
| FR | 2973962 A1 | 10/2012 |
| MX | 2015014994 A | 5/2016 |

* cited by examiner

CHARGE GUN, ELECTRIC VEHICLE SUPPLY EQUIPMENT, AND ELECTRIC VEHICLE CHARGING METHOD THEREOF

RELATED APPLICATIONS

This application claims priority to Taiwan Application Serial Number 105115259, filed May 18, 2016, which is herein incorporated by reference.

BACKGROUND

Technical Field

The present disclosure relates to a charge gun and an electric vehicle supply equipment (EVSE), and in particular, to the charge gun and the electric vehicle supply equipment (EVSE) with over temperature protection.

Description of Related Art

In recent times, as environmental awareness rises, developing electric vehicles powered by electricity to replace traditional automobiles powered by fossil-based fuels has gradually becoming an important target of automobile industry.

However, in order to reduce charging time, an electric vehicle supply equipment nowadays requires high power to charge the electric vehicles. As a result, a charging socket is easily damaged and burnout due to high temperature, thus raising safety concerns.

Therefore, how to design a charge gun and an EVSE with an over-temperature protecting function is an important research topic in the field.

SUMMARY

One aspect of the present disclosure is a charge gun. The charge gun includes at least one charging terminal, a ground terminal, a control pilot terminal and an over temperature detecting circuit. The charging terminal is configured to be electrically coupled to an electric vehicle to charge the electric vehicle. The ground terminal is electrically coupled to an equipment ground. The control pilot terminal is configured to transmit a control pilot signal between the charge gun and the electric vehicle. The over-temperature detecting circuit is electrically coupled between the ground terminal and the control pilot terminal. The over-temperature detecting circuit includes a temperature sensor and a resistance of temperature sensor changes correspondingly when temperature of the charge gun exceeds a safety limit value.

Another aspect of the present disclosure is an electric vehicle supply equipment. The electric vehicle supply equipment includes a charge gun and a charging module. The charge gun is configured to be connected to an electric vehicle. The charge gun includes at least one charging terminal, a ground terminal electrically coupled to an equipment ground, a control pilot terminal configured to transmit a control pilot signal between the charge gun and the electric vehicle, and an over temperature detecting circuit electrically coupled between the ground terminal and the control pilot terminal. The over temperature detecting circuit includes a temperature sensor, and a resistance of the temperature sensor changes correspondingly when temperature of the charge gun exceeds a safety limit value. The charging module is electrically coupled to the charge gun through a charging wire. The charging module includes a control circuit, and the control circuit is configured to control the charge gun to charge the electric vehicle through the at least one charging terminal according to the control pilot signal.

Yet another aspect of the present disclosure is an electric vehicle charging method. The electric vehicle charging method includes: charging, by a charge gun of an electric vehicle supply equipment, an electric vehicle through at least one charging terminal according to a control pilot signal; detecting, by a temperature sensor of the electric vehicle supply equipment, temperature of the charge gun; and changing a resistance of the temperature sensor correspondingly when a temperature of the charge gun exceeds a safety limit value, such that a positive level or a negative level of the control pilot signal is switched from a first level to a second level different from the first level.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
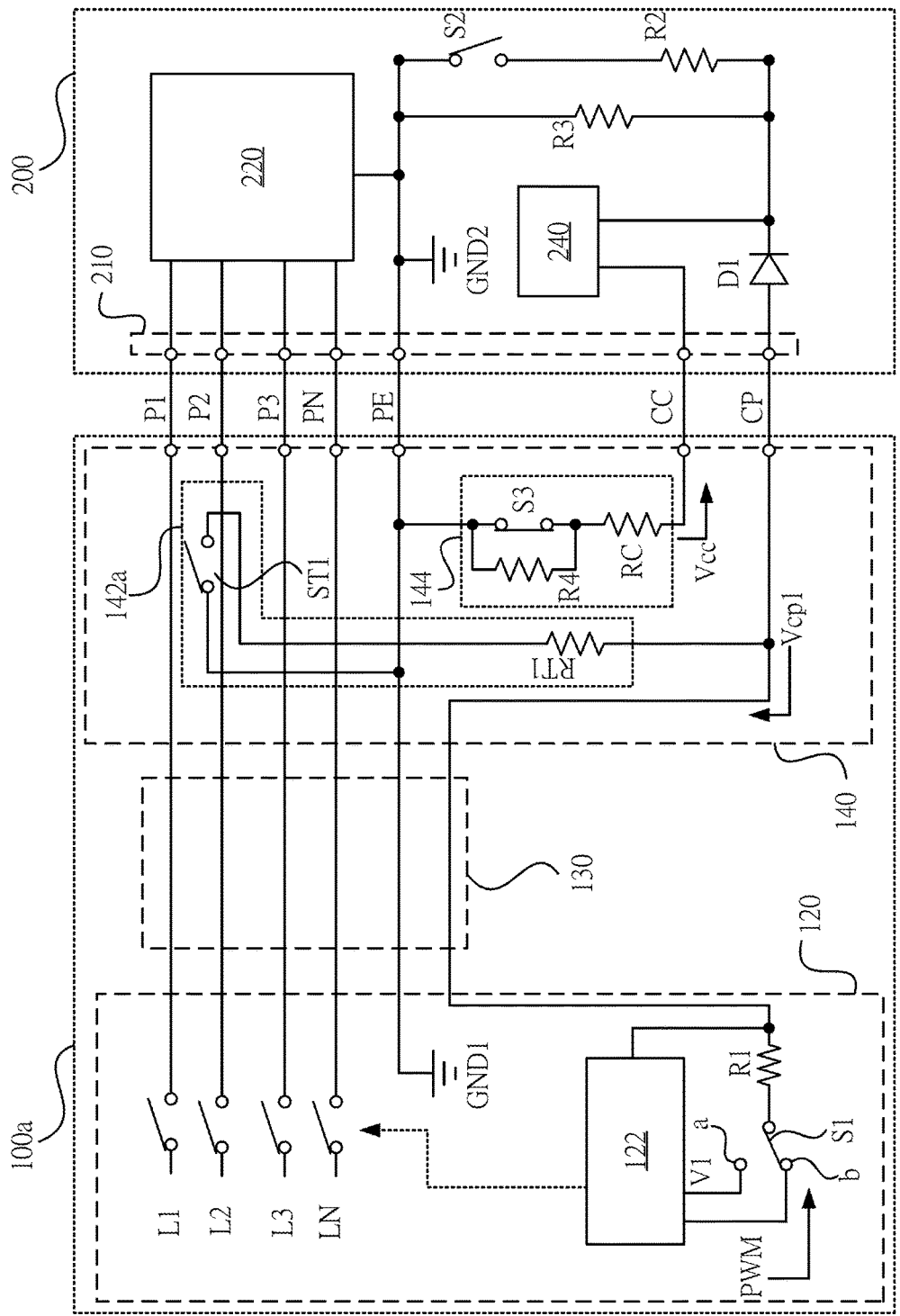
FIG. 1 is a diagram illustrating charging of an electric vehicle according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating charging of an electric vehicle according to some embodiments of the present disclosure. As shown in FIG. 1, a charging device 100a is configured to charge an electric vehicle (EV) 200. In some embodiments, the charging device 100a may be an Electric Vehicle Supply Equipment (EVSE), which includes a charging module 120, a charging wire 130 and a charge gun 140. The charge gun 140 is connected to the charging module 120 through the charging wire 130, and is configured to transmit electricity power through the charging wire 130. Thus, the charge gun 140 may be configured to charge the electric vehicle 200 when being connected to the electric vehicle 200.

Specifically, in some embodiments, the charge gun 140 includes multiple terminals corresponding to a socket 210 of the electric vehicle 200, such that the charge gun 140 and the electric vehicle 200 may be electrically coupled to each other. For example, in the embodiment shown in FIG. 1, the charge gun 140 includes charging terminals P1-P3 and PN, a ground terminal PE, a control pilot terminal CP and a connection confirming terminal CC.

When the charge gun 140 is connected to the electric vehicle 200, the charging terminals P1-P3 in the charge gun 140 are configured to be electrically coupled to a power storage system 220 in the electric vehicle 200 through the corresponding terminals on the socket 210 in the electric vehicle 200, thereby charging the electric vehicle 200. For example, the power storage system 220 may be an EV onboard charger system. As shown in FIG. 1, in some embodiments, the charging device 100a may be an AC type charging device, and the charging terminals P1-P3 are configured to provide three-phase AC power, and the charging terminal PN may be a neutral point of the three-phase electricity system, but the present disclosure is not limited thereto. For example, in some other embodiments, the charging device 100a may also be a DC type charging device, and is configured to provide DC power to the electric vehicle 200 through corresponding charging terminals.

The ground terminal PE in the charge gun 140 is electrically coupled to an equipment ground GND1 in the charging device 100a through the charging wire 130, and corresponds to the terminal electrically coupled to an EV ground GND2 on the socket 210 in the electric vehicle 200. Thus, when the charge gun 140 is connected to the electric vehicle 200, both sides of the charging device 100a and the electric vehicle 200 may have the same reference levels.

The connection confirming terminal CC in the charge gun 140 is configured to be electrically coupled to the electric vehicle 200, and is configured to enable the control circuit in the electric vehicle 200 to detect whether a user is connecting the charge gun 140 to the socket 210 of the electric vehicle 200, or is plugging out the charge gun 140 from the socket 210 of the electric vehicle 200, so as to switch off the electricity path immediately to prevent accidents from happening.

The control pilot terminal CP in the charge gun 140 is configured to transmit a control pilot signal Vcp1 between the charge gun 140 and the electric vehicle 200, such that the control circuit in the charging device 100a and the electric vehicle 200 may detect charging information such as whether the charge gun 140 is connected to or detached from the electric vehicle 200, whether the charging preparation is completed, the amount of the charging current required by the electric vehicle 200, and whether the charging process is completed, according to a voltage level and a duty cycle of the control pilot signal Vcp1, in which specific operations will be explained in details in the following paragraphs.

As shown in FIG. 1, the charging module 120 in the charging device 100a includes a control circuit 122 electrically coupled to the control pilot terminal CP through the charging wire 130, and is configured to control the charge gun 140 to charge the electric vehicle 200 through the charging terminals P1-P3 and PN according to the control pilot signal Vcp1.

Specifically, in some embodiments, when the charge gun 140 is not connected to the electric vehicle 200, the switching unit S1 in the charging module 120 is configured to be switched to the node a, such that the first terminal of the resistance unit R1 receives a predetermined voltage V1 of a first level (e.g., about 12 Volts). Meanwhile, the control pilot signal Vcp1 received by the control circuit 122 from the second terminal of the resistance unit R1 is also at the first level.

When the charge gun 140 and the electric vehicle 200 are connected, since the charging device 100a and the electric vehicle 200 are commonly grounded via the ground terminal PE, the resistance unit R1 in the charging module 120 and the diode unit D1 and the resistance unit R3 in the electric vehicle 200 are electrically coupled in series, and form an electricity path such that the voltage level of the control pilot signal Vcp1 is voltage divided to a second level (e.g., about 9 volts) that is lower than the first level.

Meanwhile, the control circuit 122 detects changes of the control pilot signal Vcp1, and controls the switching unit S1 to be switched to the node b, such that the first terminal of the resistance unit R1 receives a pulse width modulation signal PWM (e.g., a switching signal having a high level of about 12 Volts and a low level of about −12 Volts). Thus, since the diode unit D1 is turned on in the forward period, such that the resistance unit R1 and the resistance unit R3 are electrically coupled in series for dividing voltage, and the diode unit D1 is turned off in the reversed period, the control pilot signal Vcp1 is configured to be switching between the second level (e.g., about 9 volts) and the low level (e.g., about −12 volts).

Thus, the control circuit 240 in the electric vehicle 200 may be configured to check a state of the charging device 100a by detecting the control pilot signal Vcp1, and to perform charging preparation. For example, the control circuit 240 may output a corresponding signal to turn on the switching unit S2, such that the resistance unit R2 and the resistance unit R3 are electrically coupled in parallel. Accordingly, the control pilot signal Vcp1 will switch between a third level (e.g., about 6 volts) that is lower than the second level and the low level (e.g., about −12 volts) due to the electricity path formed by the resistance unit R2. Meanwhile, the control circuit 122 may control the power line L1-L3 and LN of the charging device 100a to start supplying power correspondingly after detecting the change of the control pilot signal Vcp1, and to charge the power storage system 220 in the electric vehicle 200 through the charging terminal P1-P3 and PN of the charge gun 140.

When the charging of the electric vehicle 200 is completed or desired to be terminated, the control circuit 240 may be used to correspondingly control the on and off of the switching unit S2, and the control circuit 122 may be used to correspondingly control the switching of the switching unit S1, thereby enabling the control pilot signal Vcp1 to have specific levels to notify the charging device 100a to stop supplying power, in which such specific operations may be achieved by executing the aforementioned operations reversely, and thus further explanation is omitted for the sake of brevity.

Reference is again made to FIG. 1. In some embodiments, the charge gun 140 further includes an over temperature detecting circuit 142a and a connection confirming circuit 144, in addition to the multiple terminals. Specifically, the over temperature detecting circuit 142a is electrically coupled between the ground terminal PE (i.e., the equipment ground GND1) and the control pilot terminal CP.

The connection confirming circuit 144 is electrically coupled between the connection confirming terminal CC and the ground terminal PE, and is configured to output a connection confirming signal Vcc to the control circuit 240 in the electric vehicle 200, so as to control the charging of the electric vehicle 200 performed by the charge gun 140.

Specifically, in some embodiments, the connection confirming circuit 144 includes resistance units R4 and RC, and a switching unit S3. The resistance unit R4 and the switching unit S3 are electrically coupled in parallel, and then are electrically coupled to the resistance unit RC in series. The switching unit S3 may be a normally closed switch which is conductive and bypasses the resistance unit R4 terminal at normal time. When the user is about to plug out the charge gun 140 and presses an operating button on the charge gun 140, the switching unit S3 is turned off correspondingly and the overall resistance value of the connection confirming circuit 144 is changed, and then the voltage level of the connection confirming signal Vcc is further changed. Therefore, the control circuit 240 may perform corresponding control to stop the power transmission between the charging device 100a and the electric vehicle 200 when detecting the change of the voltage level of the connection confirming signal Vcc, thereby ensuring the safety of the user and the charging system.

The over temperature detecting circuit 142a includes a temperature sensor ST1, and a resistance of the temperature sensor ST1 changes correspondingly when the temperature sensor ST1 detects that a temperature of the charge gun 140 exceeds a safety limit value. Specifically, the temperature sensor ST1 may be realized by various circuit elements such as temperature switches, thermistors, temperature coefficient resettable fuses, etc. For example, the temperature sensor ST1 may include a temperature switch. The temperature switch is turned off when the temperature of the charge gun 140 is lower than the safety limit value. On the other hand, the temperature switch is turned on when the temperature of the charge gun 140 exceeds the safety limit value. Accordingly, the over temperature detecting circuit 142a may change the overall resistance value of the over temperature detecting circuit 142a by changing the resistance of the temperature sensor ST1 to different states, and then may change the waveform characteristics of the control pilot signal Vcp1.

For example, as shown in FIG. 1, in some embodiments, the over temperature detecting circuit 142a includes a resistance unit RT1 electrically coupled to the temperature sensor ST1 in series.

Figure 2:
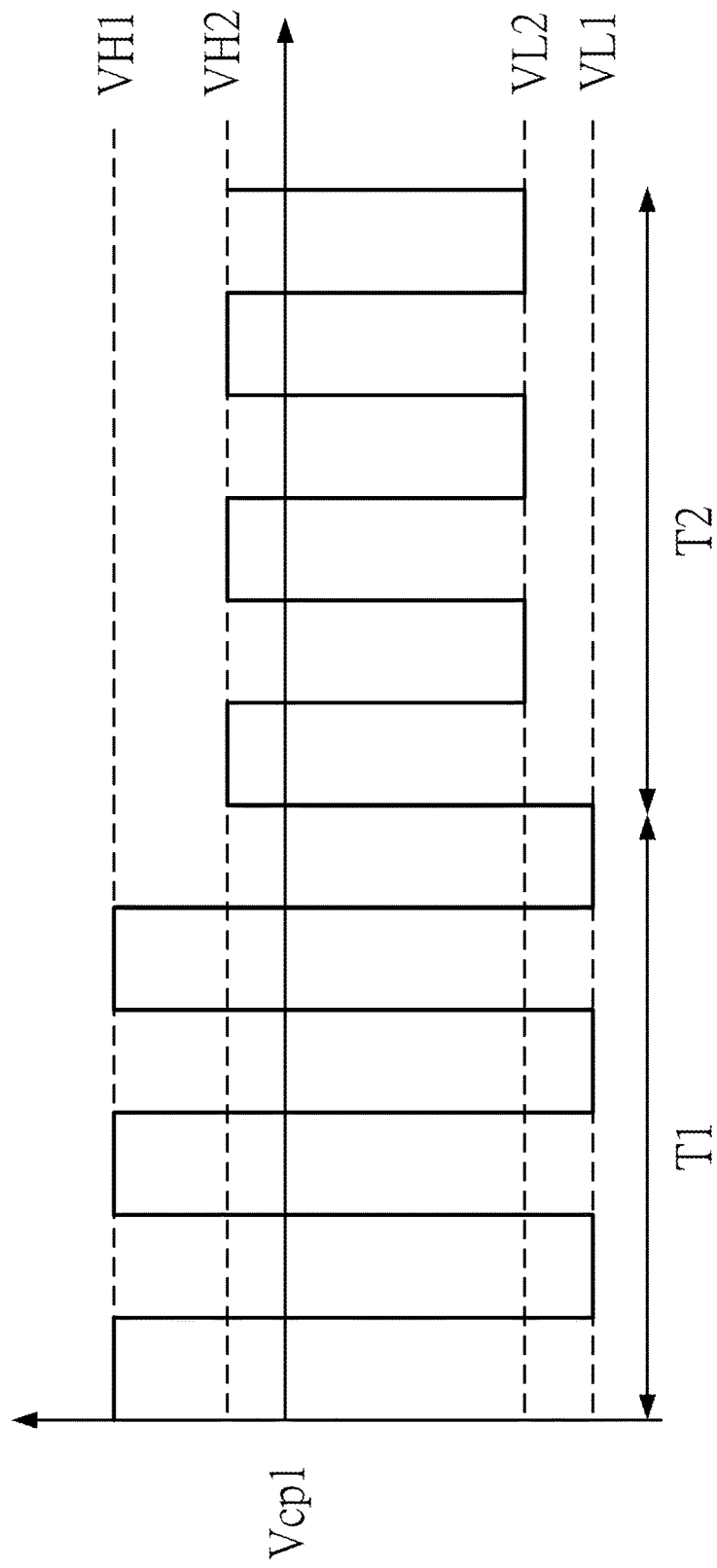
FIG. 2 is a waveform diagram illustrating a control pilot signal shown in FIG. 1 according to some embodiments of the present disclosure.

Reference is made to FIG. 2 together with FIG. 1. FIG. 2 is a waveform diagram illustrating the control pilot signal Vcp1 shown in FIG. 1 according to some embodiments of the present disclosure. As shown in FIG. 2, in a period T1, the temperature switch is turned off when the temperature of the charge gun 140 is lower than the safety limit value, and thus the control pilot signal Vcp1 switches between the high level VH1 and the low level VL1. For example, the high level VH1 may be about 6 volts and the low level VL1 may be about −12 volts.

When the temperature of the charge gun 140 exceeds the safety limit value and the temperature switch is turned on to cause the resistance of the over temperature detecting circuit 142a to be changed, since the temperature sensor ST1 and the resistance unit R1 are electrically coupled in series between the control pilot terminal CP and the equipment ground GND1, the control pilot signal Vcp1 switches between the high level VH2 and the low level VL2 after being voltage divided at this time, as shown in the period T2 in FIG. 2.

In some embodiments, the high level VH2 is lower than the high level VH1, and the low level VL2 is higher than the low level VL1. For example, in some embodiments, the high level VH2 may be about 2 volts, and the low level VL2 may be about −10 volts, but the present disclosure is not limited thereto. One skilled in the art may arrange the resistance value of the resistance unit R1-R3 and the resistance unit RT1 based on actual needs, so as to adjust the voltage waveform of the control pilot signal Vcp1. In addition, as stated in the above paragraphs, the temperature sensor ST1 may be implemented by various circuit elements such as thermistors, such that the over temperature detecting circuit 142a has different resistance values under a normal operation and an over temperature operation, and then the waveform characteristics of the control pilot signal Vcp1 can be further realized, as illustrated in FIG. 2.

Therefore, the control circuit 122 in the charging module 120 may determine whether the temperature of the charge gun 140 exceeds the safety limit value by detecting the control pilot signal Vcp1, and performs protection operations accordingly. For example, in some embodiments, the control circuit 122 controls the charging module 120 to lower the output to the electric vehicle 200 when the control circuit 122 determines that over temperature occurs in the charge gun 140. In some other embodiments, the control circuit 122 may also control the charging module 120 to stop charging the electric vehicle 200, or to output a warning signal. For example, the control circuit 122 may collaborate with an audio module, a lighting module, or a display module etc. to warn the user with sound or light that charging is abnormal.

Accordingly, there is no need to design extra signal lines for transmitting the temperature detection signal in the charging wire 130, and the abnormal temperature information may be provided to the control circuit 122 in the charging device 100a by the control pilot signal Vcp1. Therefore, the charging wire 130 may be simplified and the design cost of the charging wire 130 may be reduced. In some embodiments, the control circuit 240 of the electric vehicle 200 may also receive the abnormal temperature information by the control pilot signal Vcp1 and stop the charging operations from the electric vehicle 200 side to protect the electric vehicle 200.

Figure 3:
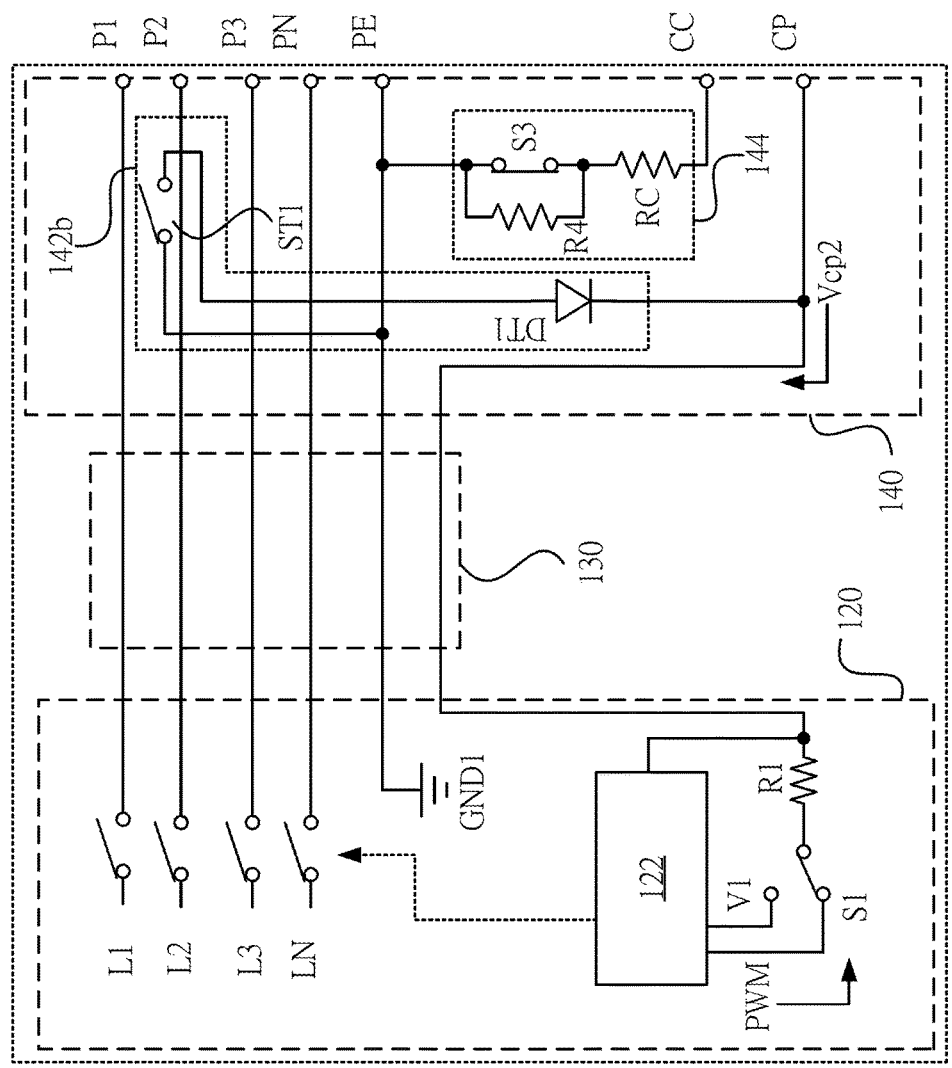
FIG. 3 is a diagram illustrating a charging device according to some other embodiments of the present disclosure.

Reference is made to FIG. 3. FIG. 3 is a diagram illustrating a charging device 100b according to some other embodiments of the present disclosure. With respect to FIG. 1, in which like elements in FIG. 3 are designated with the same reference numbers for ease of understanding. As shown in FIG. 3, in some embodiments, the over temperature detecting circuit 142b may include the temperature sensor ST1 and a diode unit DT1. In the embodiment shown in FIG. 3, the diode unit DT1 is electrically coupled to the temperature sensor ST1 in series. Specifically, the anode terminal of the diode unit DT1 is electrically coupled to the temperature sensor ST1, and the cathode terminal of the diode unit DT1 is electrically coupled to the control pilot terminal CP.

Figure 4:
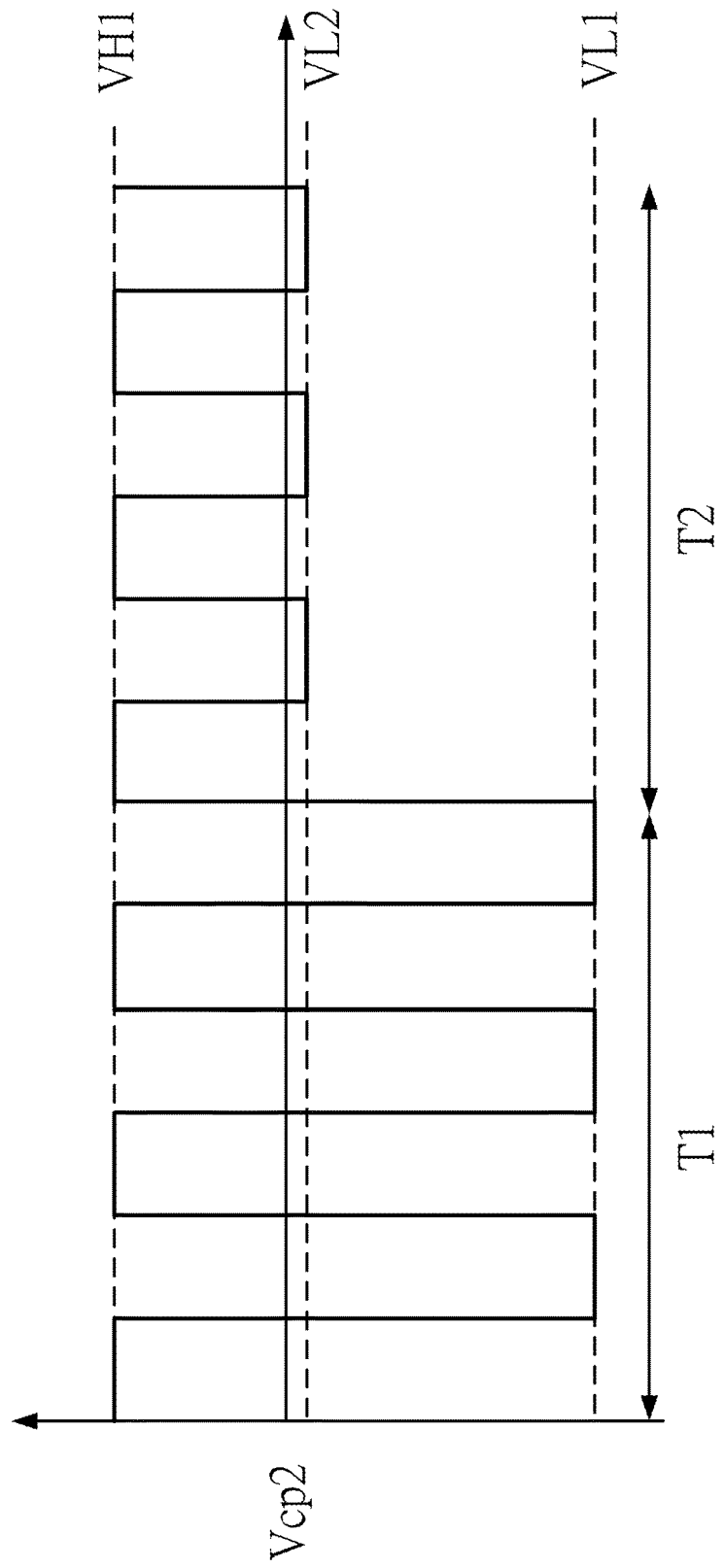
FIG. 4 is a waveform diagram illustrating a control pilot signal shown in FIG. 3 according to some embodiments of the present disclosure.

Reference is made to FIG. 4 together with FIG. 3. FIG. 4 is a waveform diagram illustrating a control pilot signal Vcp2 shown in FIG. 3 according to some embodiments of the present disclosure. As shown in FIG. 4, in a period T1, the temperature sensor ST1 is turned off when the temperature of the charge gun 140 is lower than the safety limit value, and thus the control pilot signal Vcp2 switches between the high level VH1 and the low level VL1. For example, the high level VH1 may be about 6 volts and the low level VL1 may be about −12 volts.

When the temperature of the charge gun 140 exceeds the safety limit value, the temperature sensor ST1 is turned on to enable the diode unit DT1 to be coupled between the control pilot terminal CP and the equipment ground GND1. Thus, in the forward period, the diode unit DT1 is off and the level of the control pilot signal Vcp2 remains unchanged. On the other hand, in the reversed period, the diode unit DT1 is on and the low level of the control pilot signal Vcp2 is clamped at the low level VL2, as shown in the period T2 in FIG. 2. For example, in some embodiments, the high level VH1 may be about 6 volts, the low level VL1 may be about −12 volts, and the low level VL2 may be about −0.7 volts, but the present disclosure is not limited thereto. One skilled in the art may arrange the diode unit DT1 based on actual needs to adjust the voltage waveform of the control pilot signal Vcp2. In addition, in some embodiments, the over temperature detecting circuit 142b may further include a resistance unit electrically coupled to the diode unit DT1 in series to further adjust the voltage level of the control pilot signal Vcp2, in which the operations are discussed in the aforementioned embodiments, and thus are omitted herein for the sake of brevity.

Figure 5:
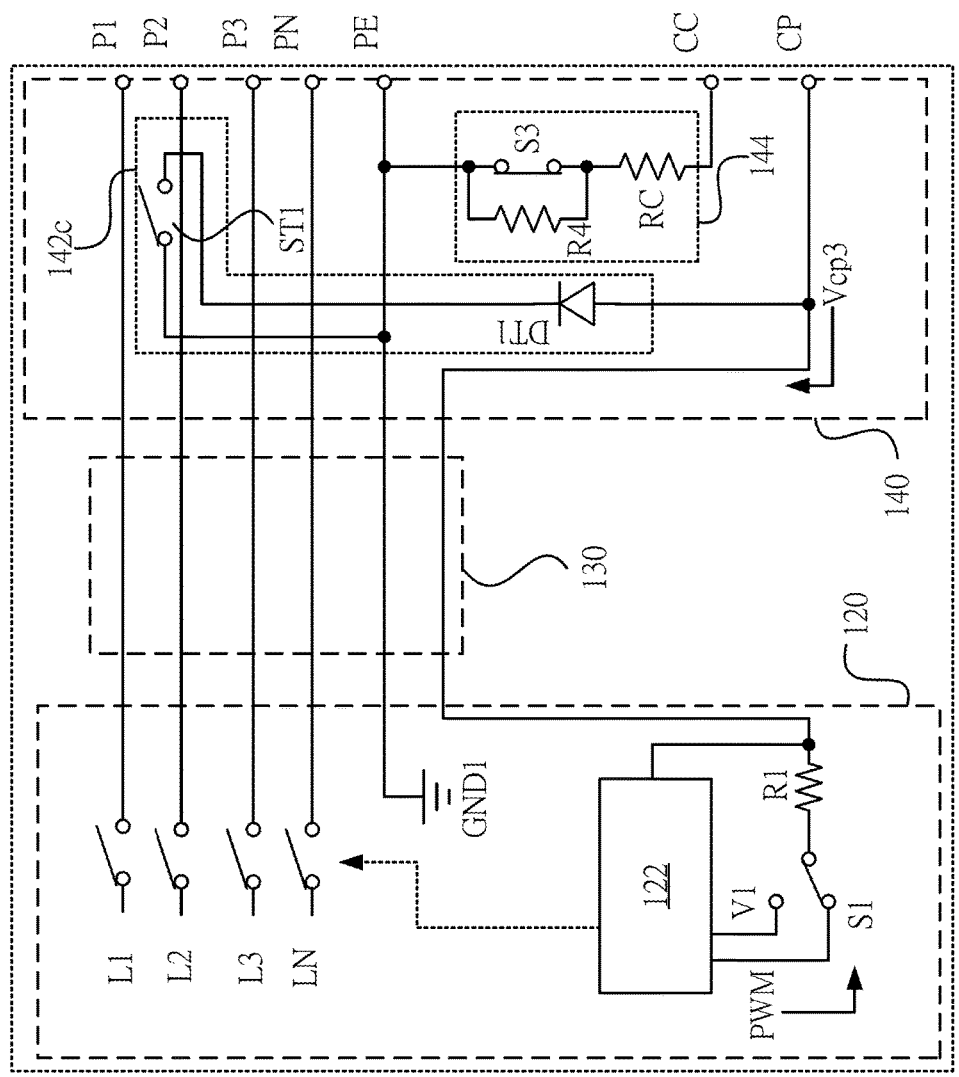
FIG. 5 is a diagram illustrating a charging device according to some other embodiments of the present disclosure.

Reference is made to FIG. 5. FIG. 5 is a diagram illustrating a charging device 100c according to some other embodiments of the present disclosure. With respect to FIG. 1 and FIG. 3, like elements in FIG. 5 are designated with the same reference numbers for ease of understanding. Compared to the embodiment shown in FIG. 3, in the embodiment shown in FIG. 5, the over temperature detecting circuit 142b also includes the temperature sensor ST1 and the diode unit DT1, but the cathode terminal of the diode unit DT1 is electrically coupled to the temperature sensor ST1, and the anode terminal of the diode unit DT1 is electrically coupled to the control pilot terminal CP.

Figure 6:
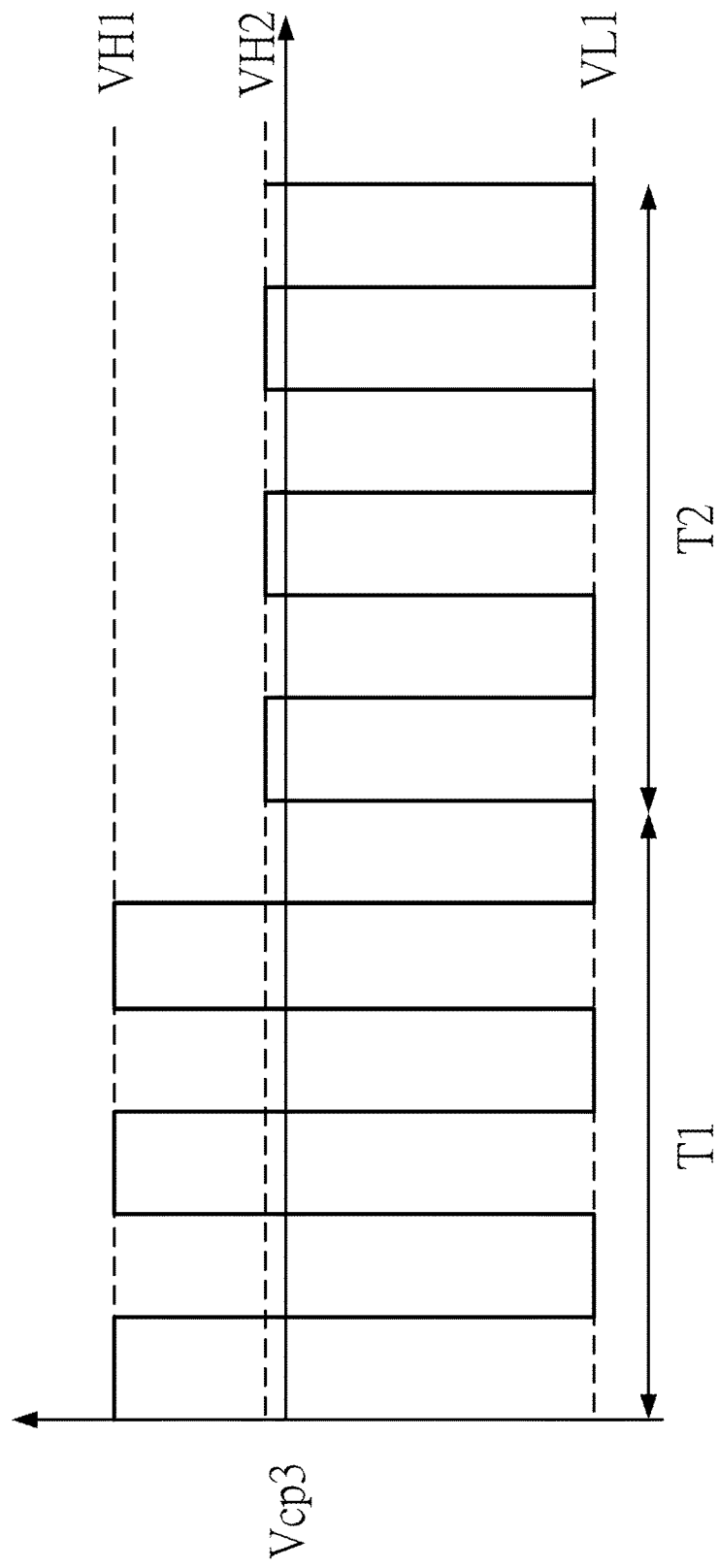
FIG. 6 is a waveform diagram illustrating a control pilot signal shown in FIG. 5 according to some embodiments of the present disclosure.

Reference is made to FIG. 6 together with FIG. 5. FIG. 6 is a waveform diagram illustrating a control pilot signal Vcp3 shown in FIG. 5 according to some embodiments of the present disclosure. As shown in FIG. 6, similar to the aforementioned embodiments, in a period T1, the temperature sensor ST1 is turned off when the temperature of the charge gun 140 is lower than the safety limit value, and thus the control pilot signal Vcp3 switches between the high level VH1 and the low level VL1. For example, the high level VH1 may be about 6 volts and the low level VL1 may be about −12 volts.

When the temperature of the charge gun 140 exceeds the safety limit value, the temperature sensor ST1 is turned on such that the diode unit DT1 is coupled between the control pilot terminal CP and the equipment ground GND1. Thus, in the reversed period, the diode unit DT1 is off and the level of the control pilot signal Vcp3 remains unchanged. On the other hand, in the forward period, the diode unit DT1 is on and the high level of the control pilot signal Vcp3 is clamped at the high level VH2, as shown in the period T2 in FIG. 6. For example, in some embodiments, the low level VL1 may be about −12 volts, the high level VH1 may be about 6 volts, and the high level VH2 may be about 0.7 volts, but the present disclosure is not limited thereto. One skilled in the art may arrange the diode unit DT1 based on actual needs to adjust the voltage waveform of the control pilot signal Vcp3. In addition, in some embodiments, the over temperature detecting circuit 142c may further include a resistance unit electrically coupled to the diode unit DT1 in series to further adjust the voltage level of the control pilot signal Vcp3, in which the operations are clearly discussed in the aforementioned embodiments, and thus are omitted herein for the sake of brevity.

Alternatively stated, as discussed in the various embodiments mentioned above, the over temperature detecting circuits 142a-142c may be implemented in various ways. When the temperature of the charge gun 140 exceeds the safety limit value, the over temperature detecting circuits 142a-142c control a positive level and/or a negative level of the control pilot signals Vcp1-Vcp3 to be switched from a first level to a second level that is different from the first level. Therefore, the control circuit 122 may perform over temperature protection according to the level changes of the control pilot signal Vcp1-Vcp3. Specifically, when the positive level or the negative level of the control pilot signal Vcp1-Vcp3 is at the second level, the control circuit 122 is configured to control the charge gun 140 to stop charging the electric vehicle 200 according to the control pilot signal Vcp1-Vcp3. In addition, in some embodiments, the control circuit 122 may also control the charging device 100a-100c to lower the output or to output the warning signal.

It is noted that, in some embodiments, the temperature sensor ST1 in the charge gun 140 may be arranged adjacent to each terminal of the charge gun 140 to sense the temperature of the charge gun 140. In some embodiments, plural temperature sensors may be arranged in the over temperature detecting circuit to increase the sensitivity of the temperature sensing.

Figure 7:
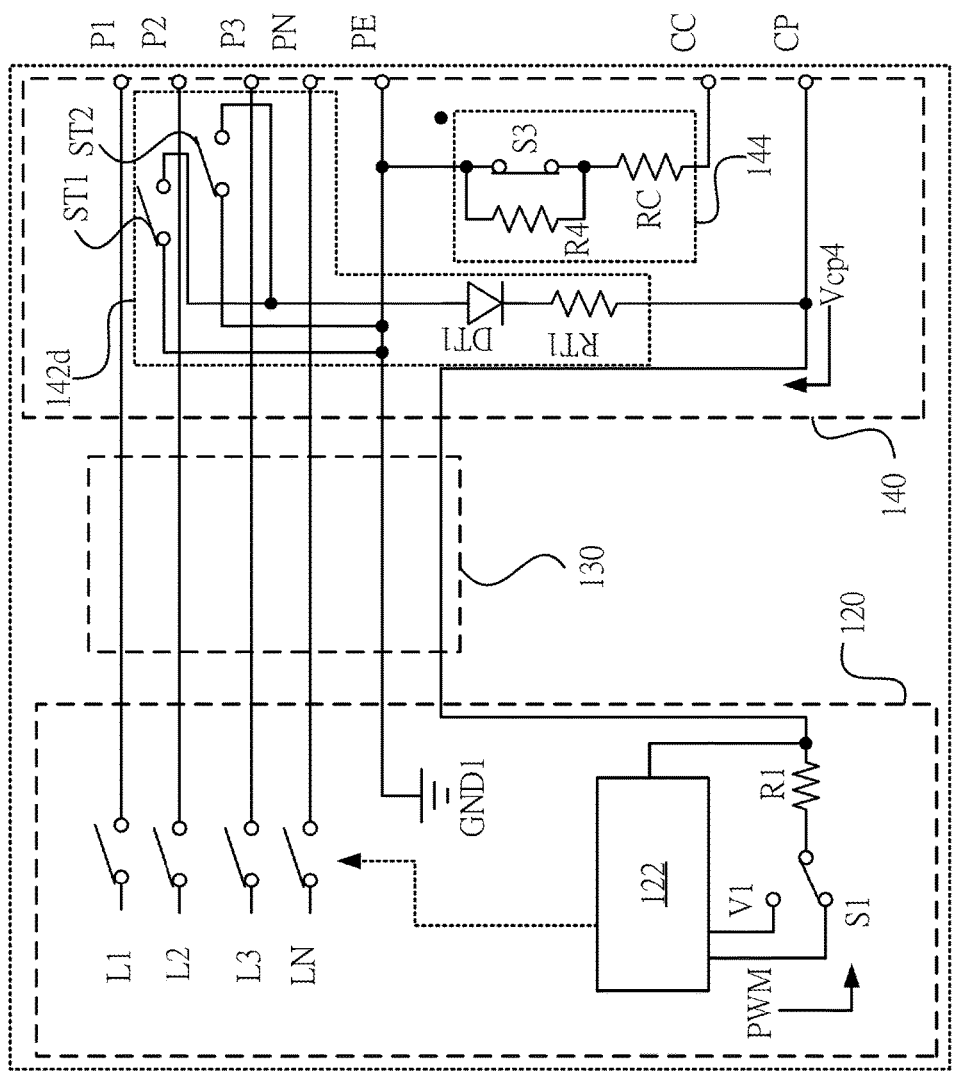
FIG. 7 is a diagram illustrating a charging device according to some other embodiments of the present disclosure.

Reference is made to FIG. 7. FIG. 7 is a diagram illustrating a charging device 100d according to some other embodiments of the present disclosure. As shown in the figure, in the present embodiment, the over temperature detecting circuit 142d includes the temperature sensors ST1 and ST2 electrically coupled in parallel, the diode unit DT1 and the resistance unit RT1. Therefore, when any one of the temperature sensors ST1 and ST2 detects that temperature exceeds the safety limit value and turned on, the diode unit DT1 and the resistance unit RT1 electrically coupled in series are coupled between the equipment ground GND1 and the control pilot terminal CP along with the temperature sensor ST1 or ST2 that is turned on, and then the high level and/or the low level of the control pilot signal Vcp4 is changed.

It is noted that the temperature sensor ST1, ST2 may be arranged in proper locations of the charge gun 140 to increase the sensitivity based on actual needs. In addition, the amounts of the temperature sensors, diode units, and resistance units are merely illustrated as examples to simplify the explanation, and do not intend to limit the present disclosure.

Figure 8:
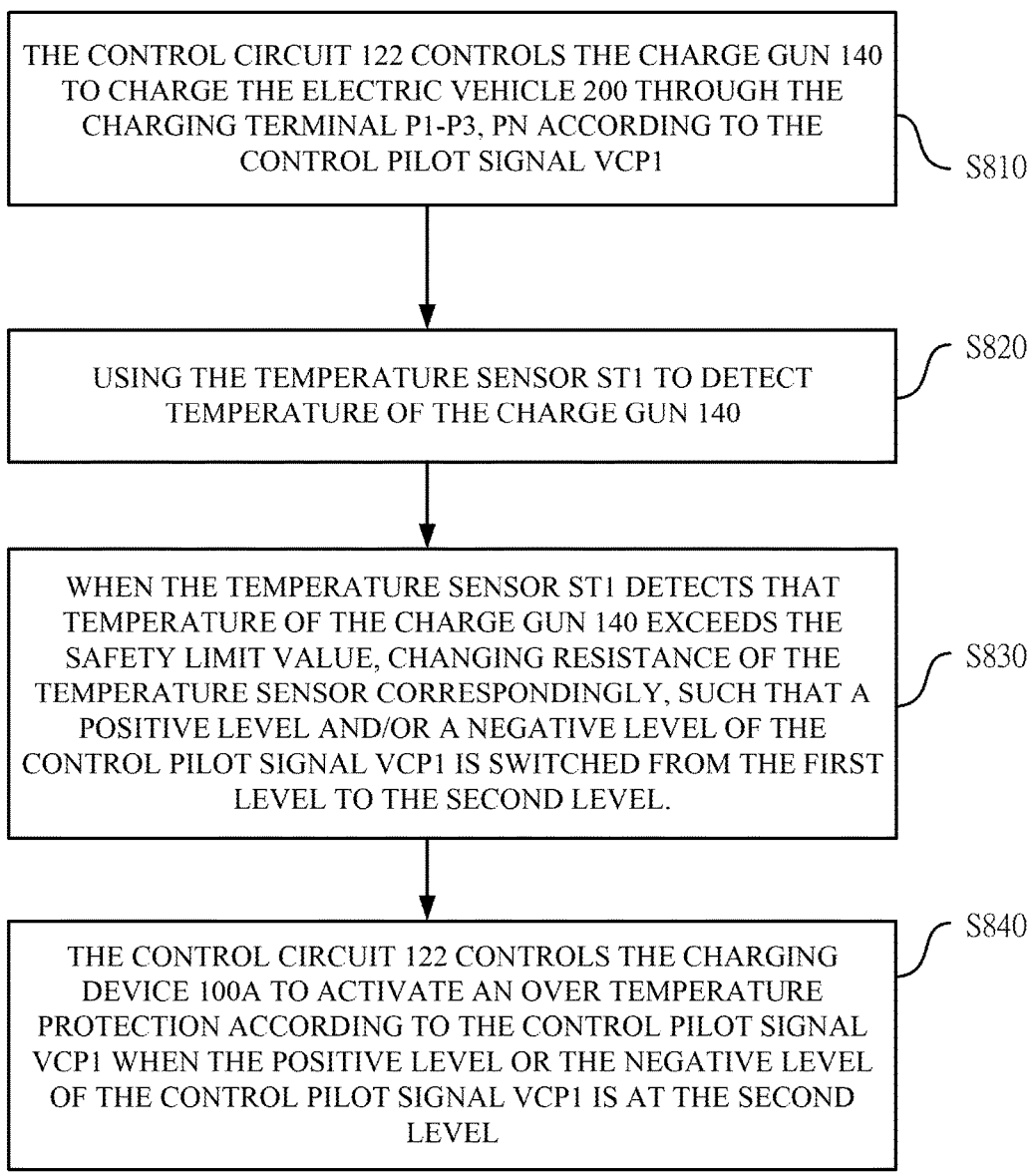
FIG. 8 is a flowchart illustrating an electric vehicle charging method according to some embodiments of the present disclosure.

Reference is made to FIG. 8. FIG. 8 is a flowchart illustrating an electric vehicle charging method 800 according to some embodiments of the present disclosure. For better understanding of the present disclosure, an electric vehicle charging method 800 is discussed in relation to the embodiments shown in FIGS. 1-7, but is not limited thereto. It will be apparent to those skilled in the art that various modifications and variations can be made without departing from the scope or spirit of the disclosure. As shown in FIG. 8, the electric vehicle charging method 800 includes steps S810, S820, S830, and S840.

At first, in step S810, the control circuit 122 controls the charge gun 140 to charge the electric vehicle 200 through the charging terminal P1-P3, PN according to the control pilot signal Vcp1. Next, in step S820, the temperature sensor ST1 is used to detect temperature of the charge gun 140.

Next, in step S830, when the temperature sensor ST1 detects that the temperature of the charge gun 140 exceeds the safety limit value, a resistance of the temperature sensor is changed correspondingly, such that a positive level and/or a negative level of the control pilot signal Vcp1 is switched from the first level to the second level. For example, in some embodiments, the temperature sensor ST1 includes a temperature switch, and the temperature switch is turned off when the temperature of the charge gun 140 is lower than the safety limit value, and the temperature switch is turned on when the temperature of the charge gun 140 exceeds the safety limit value.

Next, in step S840, the control circuit 122 controls the charging device 100a to activate an over temperature protection according to the control pilot signal Vcp1 when the positive level or the negative level of the control pilot signal Vcp1 is at the second level. For example, in some embodiments, the control circuit 122 controls the charge gun 140 of the charging device 100a to stop charging the electric vehicle 200. In some other embodiments, the control circuit 122 may also control the charging device 100a to lower the output to the electric vehicle 200, or to output a warning signal, but the present disclosure is not limited thereto. One skilled in the art may perform various over temperature protections by properly arranging the control circuit 122, in order to prevent the burnout of the elements and circuits in the system under high temperature and ensure the safety of the users.

Those skilled in the art can immediately understand how to perform the operations and functions of the electric vehicle charging method 800 based on the charging device 100a-100d in the various embodiments described above, and thus further explanation is omitted herein for the sake of brevity.

While disclosed methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Alternatively stated, the order of the operations disclosed in the present disclosure may be changed, or the operations may even be executed simultaneously or partially simultaneously as appropriate, in accordance with the spirit and scope of various embodiments of the present disclosure.

In sum, in the present disclosure, by applying the various embodiments described above, the over temperature detecting circuit arranged in the charge gun is used to control the voltage level of the control pilot signal. Therefore, the control circuit in the control module may determine whether the temperature of the charge gun exceeds the safety limit value by detecting the control pilot signal, and perform corresponding protection accordingly.

In addition, the elements in the above embodiments may be implemented by various digital or analog circuits, and may also be implemented by different integrated circuit chips. Each element may also be integrated in a single digital control chip. Each control circuit may also be realized by various processors or other integrated circuit chips. The above list is merely exemplary and is not meant to be limitations of the present disclosure.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A charge gun, comprising:
    at least one charging terminal configured to be electrically coupled to an electric vehicle to charge the electric vehicle;
    a ground terminal electrically coupled to an equipment ground;
    a control pilot terminal configured to transmit a control pilot signal between the charge gun and the electric vehicle; and
    an over temperature detecting circuit electrically coupled between the ground terminal and the control pilot terminal, wherein the over temperature detecting circuit comprises a temperature sensor, and a resistance of the temperature sensor changes correspondingly when a temperature of the charge gun exceeds a safety limit value, wherein when temperature of the charge gun exceeds the safety limit value, the over temperature detecting circuit is configured to control a positive level or a negative of the control pilot signal to be switched from a first level to a second level different from the first level.

2. The charge gun of claim 1, wherein the temperature sensor comprises a temperature switch, wherein the temperature switch is turned off when the temperature of the charge gun is lower than the safety limit value, and the temperature switch is turned on when the temperature of the charge gun exceeds the safety limit value.

3. The charge gun of claim 1, wherein the over temperature detecting circuit further comprises a resistance unit, and the resistance unit is electrically coupled to the temperature sensor in series.

4. The charge gun of claim 1, wherein the over temperature detecting circuit further comprises a diode unit, and the diode unit is electrically coupled to the temperature sensor in series.

5. The charge gun of claim 1, further comprising:
a connection confirming terminal configured to be electrically coupled to the electric vehicle; and
a connection confirming circuit which is electrically coupled between the connection confirming terminal and the ground terminal, and is configured to output a connection confirming signal to the electric vehicle to control the charge gun to charge the electric vehicle.

6. An electric vehicle supply equipment, comprising:
a charge gun configured to be connected to an electric vehicle, wherein the charge gun comprises:
at least one charging terminal;
a ground terminal electrically coupled to an equipment ground;
a control pilot terminal configured to transmit a control pilot signal between the charge gun and the electric vehicle; and
an over temperature detecting circuit electrically coupled between the ground terminal and the control pilot terminal, wherein the over temperature detecting circuit comprises a temperature sensor, and a resistance of the temperature sensor changes correspondingly when a temperature of the charge gun exceeds a safety limit value; and
a charging module electrically coupled to the charge gun through a charging wire, wherein the charging module comprises a control circuit, and the control circuit is configured to control the charge gun to charge the electric vehicle through the at least one charging terminal according to the control pilot signal,
wherein when temperature of the charge gun exceeds the safety limit value, the over temperature detecting circuit is configured to control a positive level or a negative of the control pilot signal to be switched from a first level to a second level different from the first level.

7. The electric vehicle supply equipment of claim 6, wherein the temperature sensor comprises a temperature switch, wherein the temperature switch is turned off when the temperature of the charge gun is lower than the safety limit value, and the temperature switch is turned on when the temperature of the charge gun exceeds the safety limit value.

8. The electric vehicle supply equipment of claim 6, wherein when the positive level or the negative level of the control pilot signal is at the second level, the control circuit is configured to control the charge gun to stop charging the electric vehicle according to the control pilot signal.

9. The electric vehicle supply equipment of claim 6, wherein the over temperature detecting circuit further comprises a resistance unit, and the resistance unit is electrically coupled to the temperature sensor in series.

10. The electric vehicle supply equipment of claim 6, wherein the over temperature detecting circuit further comprises a diode unit, and the diode unit is electrically coupled to the temperature sensor in series.

11. The electric vehicle supply equipment of claim 6, wherein the charge gun further comprises:
a connection confirming terminal configured to be electrically coupled to the electric vehicle; and
a connection confirming circuit which is electrically coupled between the connection confirming terminal and the ground terminal, and is configured to output a connection confirming signal to the electric vehicle to control the charge gun to charge the electric vehicle.

12. An electric vehicle charging method, comprising:
charging, by the charge gun of the electric vehicle supply equipment of claim 6, the electric vehicle through at least one charging terminal according to the control pilot signal;
detecting, by the temperature sensor of the electric vehicle supply equipment of claim 6, a temperature of the charge gun; and
changing the resistance of the temperature sensor correspondingly when the temperature of the charge gun exceeds the safety limit value, such that the positive level or the negative level of the control pilot signal is switched from the first level to the second level different from the first level.

13. The electric vehicle charging method of claim 12, further comprising:
turning off a temperature switch of the temperature sensor when the temperature of the charge gun is lower than the safety limit value; and
turning on the temperature switch of the temperature sensor when the temperature of the charge gun exceeds the safety limit value.

14. The electric vehicle charging method of claim 12, further comprising:
controlling, by the control circuit of the electric vehicle supply equipment, the electric vehicle supply equipment to activate an over temperature protection.

15. The electric vehicle charging method of claim 14, wherein controlling the charging device to activate the over temperature protection comprises:
controlling, by the control circuit, the charge gun to stop charging the electric vehicle according to the control pilot signal when the positive level or the negative level of the control pilot signal is at the second level.

16. The electric vehicle charging method of claim 14, wherein controlling the charging device to activate the over temperature protection comprises:
controlling, by the control circuit, the electric vehicle supply equipment to output a warning signal.

17. The electric vehicle charging method of claim 14, wherein controlling the charging device to activate the over temperature protection comprises:
controlling, by the control circuit, the electric vehicle supply equipment to lower an output to the electric vehicle.

18. The electric vehicle charging method of claim 12, further comprising:

outputting, by a connection confirming circuit of the electric vehicle supply equipment, a connection confirming signal to the electric vehicle to control the charge gun to charge the electric vehicle.

* * * * *